(12) United States Patent
Silverberg et al.

(10) Patent No.: US 10,282,478 B2
(45) Date of Patent: May 7, 2019

(54) DENSITY MODIFIED SEARCH RESULTS

(71) Applicant: PERRY STREET SOFTWARE, INC., New York, NY (US)

(72) Inventors: Eric Silverberg, New York, NY (US); Jason Marchant, New York, NY (US)

(73) Assignee: PERRY STREET SOFTWARE, INC., New York, NY (US)

( * ) Notice: Subject to any disclaimer, the term of this patent is extended or adjusted under 35 U.S.C. 154(b) by 273 days.

(21) Appl. No.: 14/462,290

(22) Filed: Aug. 18, 2014

(65) Prior Publication Data
US 2016/0048590 A1 Feb. 18, 2016

(51) Int. Cl.
G06F 17/30 (2006.01)
(52) U.S. Cl.
CPC .............................. G06F 17/3087 (2013.01)
(58) Field of Classification Search
CPC .................................................. G06F 17/3087
See application file for complete search history.

(56) References Cited

U.S. PATENT DOCUMENTS

| 6,560,530 | B1 * | 5/2003 | Yamada | G09B 29/106 340/988 |
| 8,473,512 | B2 * | 6/2013 | Petersen | G06F 17/30867 707/776 |
| 8,560,608 | B2 | 10/2013 | Petersen et al. | |
| 8,630,621 | B2 | 1/2014 | Agashe | |
| 8,660,541 | B1 | 2/2014 | Beresniewicz et al. | |
| 8,693,689 | B2 | 4/2014 | Belenkiy et al. | |
| 8,712,441 | B2 | 4/2014 | Haney | |
| 8,737,607 | B2 | 5/2014 | Appleton | |
| 8,903,837 | B2 * | 12/2014 | Murugappan | G06F 17/30041 707/758 |
| 2004/0193451 | A1 * | 9/2004 | McNair | G06F 19/327 705/2 |
| 2006/0229896 | A1 * | 10/2006 | Rosen | G06Q 10/1053 705/321 |
| 2006/0229902 | A1 * | 10/2006 | McGovern | G06Q 10/06 705/321 |
| 2007/0198505 | A1 | 8/2007 | Fuller | |
| 2007/0282621 | A1 * | 12/2007 | Altman | G06Q 10/10 705/319 |
| 2008/0086261 | A1 | 4/2008 | Robinson et al. | |
| 2008/0262901 | A1 * | 10/2008 | Banga | G06Q 10/06375 705/14.53 |

(Continued)

OTHER PUBLICATIONS

Liron Shapira, et al., U.S. Appl. No. 61/943,105, filed Feb. 21, 2015.

(Continued)

Primary Examiner — Jared M Bibbee
(74) Attorney, Agent, or Firm — Dorsey & Whitney LLP

(57) ABSTRACT

The present disclosure is related to a system and a method for varying search results of a user-based networking application. In one example, the disclosure includes a method that includes operations such as accessing from a processing element a results list responsive to an inquiry, determining by the processing element a population density corresponding to a selected location; and based on the population density, varying by the processing element one or more parameters of the results list for displaying on a user device.

26 Claims, 5 Drawing Sheets

(56) References Cited

U.S. PATENT DOCUMENTS

| | | | | |
|---|---|---|---|---|
| 2008/0263633 | A1* | 10/2008 | Banga | G06Q 30/02 |
| | | | | 726/3 |
| 2009/0327013 | A1* | 12/2009 | McGovern | G06Q 10/10 |
| | | | | 705/321 |
| 2010/0161591 | A1* | 6/2010 | Jones | G06F 17/30241 |
| | | | | 707/722 |
| 2010/0195829 | A1 | 8/2010 | Blom et al. | |
| 2010/0198917 | A1* | 8/2010 | Petersen | G06Q 10/10 |
| | | | | 709/204 |
| 2010/0250578 | A1 | 9/2010 | Athsani et al. | |
| 2011/0219422 | A1* | 9/2011 | Shen | G06F 15/16 |
| | | | | 726/1 |
| 2011/0238755 | A1 | 9/2011 | Khan et al. | |
| 2012/0117007 | A1* | 5/2012 | Agrawal | G06N 99/005 |
| | | | | 706/12 |
| 2012/0254142 | A1 | 10/2012 | Knowlton et al. | |
| 2012/0290978 | A1 | 11/2012 | Devecka | |
| 2012/0317087 | A1* | 12/2012 | Lymberopoulos | |
| | | | | G06F 17/3053 |
| | | | | 707/706 |
| 2013/0027227 | A1* | 1/2013 | Nordstrom | G08G 1/202 |
| | | | | 340/990 |
| 2013/0036459 | A1 | 2/2013 | Liberman et al. | |
| 2013/0066889 | A1* | 3/2013 | Rodriguez | G06F 17/30864 |
| | | | | 707/754 |
| 2013/0227702 | A1 | 8/2013 | Jun | |
| 2013/0290362 | A1 | 10/2013 | Poltorak | |
| 2014/0052861 | A1 | 2/2014 | Frind et al. | |
| 2014/0074820 | A1* | 3/2014 | Murphy | G06Q 30/0256 |
| | | | | 707/722 |
| 2014/0136618 | A1* | 5/2014 | Yang | H04W 4/206 |
| | | | | 709/204 |
| 2014/0136624 | A1 | 5/2014 | Abhyanker | |
| 2014/0196116 | A1 | 7/2014 | Maguire | |
| 2014/0199970 | A1 | 7/2014 | Klotz | |
| 2014/0222908 | A1 | 8/2014 | Park et al. | |
| 2015/0242421 | A1 | 8/2015 | Glover et al. | |

OTHER PUBLICATIONS

Extended European Search Report for Application No. 15833539.8, dated Dec. 6, 2017, 8 Pages.
International Search Report and Written Opinion received for PCT/US2015/45604 dated Nov. 23, 2015.
International Search Report and Written Opinion received for PCT/US2015/45686 dated Nov. 23, 2015.

* cited by examiner

DENSITY MODIFIED SEARCH RESULTS

CROSS-REFERENCE TO RELATED APPLICATIONS

This application is related to U.S. patent application Ser. No. 14/462,314 entitled "Density Dependent Search Functions" filed Aug. 18, 2014 and is incorporated in its entirety herein.

TECHNICAL FIELD

The present disclosure relates generally to computing devices, and more specifically, to varying one or more parameters for an application or program for computing devices based on population density.

BACKGROUND

Search engines are known that use location data to provide results. In some applications, such as social networking and dating applications, the location data may correspond to the location of users of the application. A results list is often displayed that illustrates all of the users within an area or location. Often these applications use the location as transmitted from the users' devices, such as a smart phone or tablet, e.g., a global positioning system (GPS) location. For example, some social networking and dating applications display user profile pictures for those users that are within a predetermined area, such as within a few miles of the requesting user or within a certain city. However, in some instances, such as where there is a large collection of people, it might be desirable to modify the results shown, vary characteristics of the results, or the like. As one example, in a high population density area it may be useful to show more accurate locations as users may have a higher chance of being able to meet up, whereas in a low population density areas, the closest users may be far apart and therefore showing accurate locations may not be as useful.

SUMMARY

One example of the present disclosure includes a method for varying search results of a user-based networking application. The method includes accessing from a processing element a results list responsive to an inquiry, determining by the processing element a population density corresponding to a selected location; and based on the population density, varying by the processing element one or more parameters of the results list for displaying on a user device.

Another example of the present disclosure includes a method for varying search results of a user-based networking application. The method includes receiving an inquiry from a querying user device, determining by a processing element a population density of a selected location, and based on the population density varying by the processing element one or more parameters of a results list configured to be displayed on the querying user device or a display associated therewith, and then transmitting the results list to the querying user device.

Another example of the disclosure includes a method for providing results in a networking application. The method includes receiving a query location corresponding to a requesting user device, determining by the processing element a population density of member devices within a predetermined range relative to the querying location, receiving by the processing element a plurality of actual member locations corresponding to each of the member devices within the predetermined range, and determining by the processing element a results location corresponding to each of the actual member locations, wherein the correspondence between the results location and the actual member location for a member device depends on the population density of member devices.

Yet another example of the present disclosure includes a system for providing results to one or more user devices. The system includes a networking for transmitting data and a server in communication with the network. The server is configured to receive an inquiry from a querying user device via the network, determine a population density of a selective location, vary one or more parameters of the results list based on the population density, and transmit the results list to the querying user device.

The system of the previous example may also include a querying user device in communication with the network. The querying user device may be configured to transmit to the server the inquiry through the network, receive the results list from the server, and display on a display screen the results list, where the results list is displayed in a grid configuration.

SPECIFICATION

Figure 1:
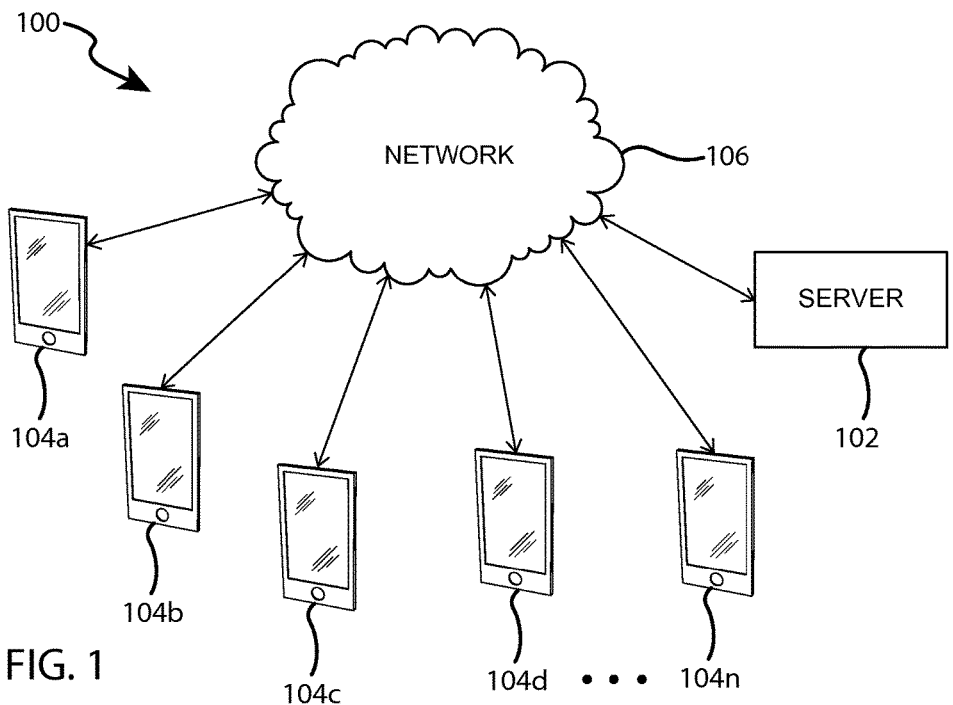
FIG. 1 is a diagram of a system for varying one more functions of an application based on user population density.

In some embodiments herein, a method for varying one or more functions or parameters of an application or user interface based on population density is disclosed. As used herein, the term population density is meant to encompass a number of people, devices, active devices (e.g., devices turned on), members, or so on, that are present within a predetermined area or location. In one embodiment, one or more functions, such as a results list, an access level, results type, and/or information displayed is variable based on the number and/or location of users within a search or results area. For example, a social networking or dating application may receive a user inquiry requesting search results regarding users within a predetermined range. A computing device, such as a server or hosting computer, may determine the population density, such as the number of users having devices that are possible results, i.e., that fall within the predetermined range or distance. Using the population density the server may determine the results that will be displayed on the requesting user's device. The results or features, such as a results list, may have a first output with a first population density and a second output with a second population density. The results list may include a single item or multiple items. By varying the results list, the server can dynamically adjust the results in a manner that corresponds to the population density of users or user devices. Additionally, in some embodiments, the population density may be independent from the results list and/or results inquiry.

In one embodiment, the results list corresponds to a display of users ordered or arranged by distance, such a displayed closest user first and farthest user last. In this embodiment, the results list may be based on location, in which case the actual location of the members or users as shown in the results may be varied as the population density increases or decreases. As an example, the server may request or may determine the actual location of the member devices, such as a GPS location. The server may randomize, vary, or otherwise modify the actual location based on the population density, where in denser areas the fewer modifications to the location information may be done. In this embodiment, in instances where it is not desirable to present the actual location due to safety or other concerns, the actual location may be obscured. Further, because the obscuring is based on population density, in dense areas where there are a lot of users or people generally, the location can be more accurate as the risk of identification (such as through trilateration or other location detecting techniques) of a particular user may be more difficult to the high concentration or other users or people. It should be noted that the population density can be based on users (e.g., number of user devices within a certain area) and/or general population (e.g., number of people in an area whether users or not users).

In other embodiments, other parameters, characteristics, and/or features that are displayed or transmitted to the requesting user device may be varied by population density. For example, under a certain population density threshold, the user's location information may not be displayed, only a general indication that the user is within the predetermined range may be shown. As another example, more information from a user's profile may be displayed in instances where the population density is higher (or lower). As yet another example, additional information such as event details, favorite lists (e.g., lists of favorite bars, clubs, retail stores, etc.) may be shown in denser areas or may include information about members that have recently been to, are going to, or are currently present at the event and/or retail location. In short, substantially any type of feature, characteristic, accessibility, and/or display function may be varied by population density depending on the functionality of the application, system constraints, or the like.

Turning now to the figures, a system and method for implementing user population density dependent functionality will now be discussed in more detail. FIG. 1 is a system 100 including a server 102 and a plurality of user devices 104a-104n in communication with one another and the server 102 via a network 106, each will be discussed in turn below.

The server 102 may be substantially any type of computing device but typically may be one or more computing devices in communication with one another that perform one or more tasks for the user devices 104a-104n. In some embodiments, the server 102 may be a computing device that hosts a web server application or other software application that transmits and receives data to and from the user devices 104a-104n. The server 102 may typically include one or more processing elements, memory components, and networking/communication interfaces, but may generally have a larger processing power and memory storage as compared to the client devices 104a-104n. The server 102 is configured to host one or more aspects of the social networking application as discussed herein.

The user devices 104a-104n may also be substantially any type of computing device. Some non-limiting examples include a smartphone, a tablet computer, a digital music player, portable gaming station, laptop computer, set top box, media player (e.g., digital video disk player, digital video recorder), or the like. In many embodiments the user devices 104a-104n may be a portable computing device with an integrated display, such as a smart phone. It should be noted that in many embodiments, the system 100 may include a querying user device and responsive or member user devices. Each of these devices may be substantially the same from each other and/or different, but are generally referred to the "querying user device" when transmitting an inquiry to the server and a "member user device" when being included in results related to the inquiry or be considered for inclusion in the results.

Figure 2:
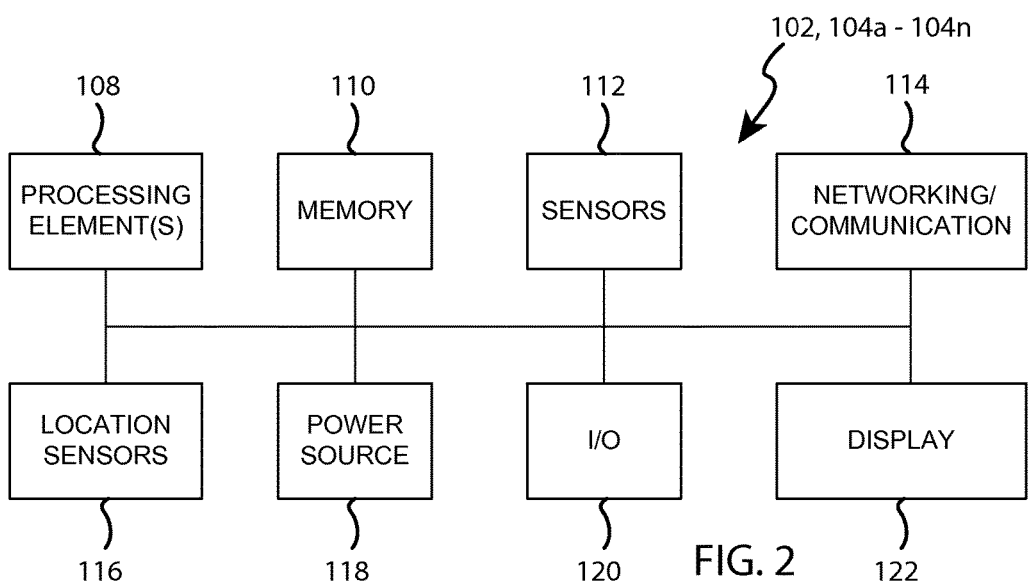
FIG. 2 is a simplified block diagram of a computing device that may be used with the system of FIG. 1.

FIG. 2 is a simplified block diagram of a computing device. With reference to FIGS. 1 and 2, the client devices 104a-104n and/or server 102 may include one or more of the components shown in FIG. 2 such as one or more processing elements 108, one or more memory components 110, one or more sensors 112, a networking/communication interface 114, a location sensor 116, a power source 118, an input/output interface 120, and/or a display 112. It should be noted that FIG. 2 is meant as exemplary only, in other examples the computing devices of the system, e.g., the server 102 and user devices 104a-104n, may include fewer or more components than those shown in FIG. 2.

The one or more processing elements 108 may be substantially any electronic device capable of processing, receiving, and/or transmitting instructions. For example, the processing element 108 may be a microprocessor or a microcomputer. Additionally, it should be noted that the processing element 108 may include more than one processing member. For example, a first processing element may control a first set of components of the computing device and a second processing element may control a second set of components of the computing device where the first and second processing elements may or may not be in communication with each other. Additionally, each processing element 108 may be configured to execute one or more instructions in parallel.

The memory 110 stores electronic data that may be utilized by the computing devices 102, 104a-104n. For example, the memory 110 may store electrical data or content e.g., audio files, video files, document files, and so on, corresponding to various applications. The memory 110 may be, for example, non-volatile storage, a magnetic storage medium, optical storage medium, magneto-optical storage medium, read only memory, random access memory, erasable programmable memory, flash memory, or a combination of one or more types of memory components. In many embodiments, the server 102 may have a larger memory capacity than the user devices 104a-140n.

The sensors 112 may provide substantially any type of input to the computing devices 102, 104a-104n. For example, the sensors 112 may be one or more accelerometers, microphones, global positioning sensors, gyroscopes, light sensors, image sensors (such as a camera), force sensors, and so on. The type, number, and location of the sensors 112 may be varied as desired and may depend on the desired functions of the system 100.

The networking/communication interface 114 receives and transmits data to and from the network 106 to each of the computing devices 102, 104a-104n. The networking/communication interface 114 may transmit and send data to the network 106, and/or other computing devices. For example, the networking/communication interface may transmit data to and from other computing devices through the network 106 which may be a cellular or other wireless network (WiFi, Bluetooth) or a wired network (Ethernet), or a combination thereof.

The location sensors 116 provide location information, such as GPS data, for the computing devices. In some embodiments the location sensors 116 may include a GPS receiver or other sensors that track the strength and other characteristics of a signal, such as a cellular signal, to determine a location for the computing device. In embodiments including a GPS receiver, the location sensors 116 may receive data from three or more GPS satellites and then may use the satellite information to determine a location of the device. The location sensors 116 may be configured to determine latitude and longitude information for the computing device, e.g., the user devices 104a-104n. It should be noted that in many embodiments the location sensors 116 may use a combination of GPS satellite data and data from other sources, such as WiFi and/or cellular towers. The accuracy, format, preciseness of the latitude and longitude (or other location data from the location sensors 116) may vary based on the type of computing device and the type of location sensors 116.

As will be discussed in more detail below, the latitude and longitude or other location data may be transmitted from the user devices 104a-104n to the sever 102. The server 102 in some instances may store the location of each of the user devices 104a-104n in an uniform resource locator (URL) or other web address that may be accessible by the server 102 and other computing devices granted access. For example, the server 102 may include a URL endpoints list that includes the location data for a plurality of the user devices 104a-104n in communication with the server 102, this will be discussed in more detail below.

The computing devices 102, 104a-104n may also include a power supply 118. The power supply 118 provides power to various components of the computing devices 102, 104a-104n. The power supply 118 may include one or more rechargeable, disposable, or hardwire sources, e.g., batteries, power cord, or the like. Additionally, the power supply 118 may include one or more types of connectors or components that provide different types of power to the computing devices 102, 104a-104n. In some embodiments, the power supply 118 may include a connector (such as a universal serial bus) that provides power to the computer or batteries within the computer and also transmits data to and from the controller 104 to the machine 102 and/or another computing device.

The input/output interface 120 allows the computing devices 102, 104a-104n to receive inputs from a user and provide output to the user. For example, the input/output interface 120 may include a capacitive touch screen, keyboard, mouse, stylus, or the like. The type of devices that interact via the input/output interface 120 may be varied as desired.

The display 122 provides a visual output for the computing devices 102, 104a-104n. The display 122 may be substantially any size and may be positioned substantially anywhere on the computing devices 102, 104a-104n. For example, the server 102, if it includes a screen, the display may be a separate component from the server 102 and in communication therewith, whereas the user devices 104a-104n may include an integrated display screen. In some embodiments, the display 122 may be a liquid crystal display screen, plasma screen, light emitting diode screen, and so on. In some embodiments, the display 122 may also function as an input device in addition to displaying output from computing device. For example, the display 122 may include capacitive touch sensors, infrared touch sensors, or the like that may capture a user's input to the display 122. In these embodiments, a user may press on the display 122 in order to provide input to the computer device. In other embodiments, the display 122 may be separate from or otherwise external to the electronic device, but may be in communication therewith to provide a visual output for the electronic device.

Figure 3:
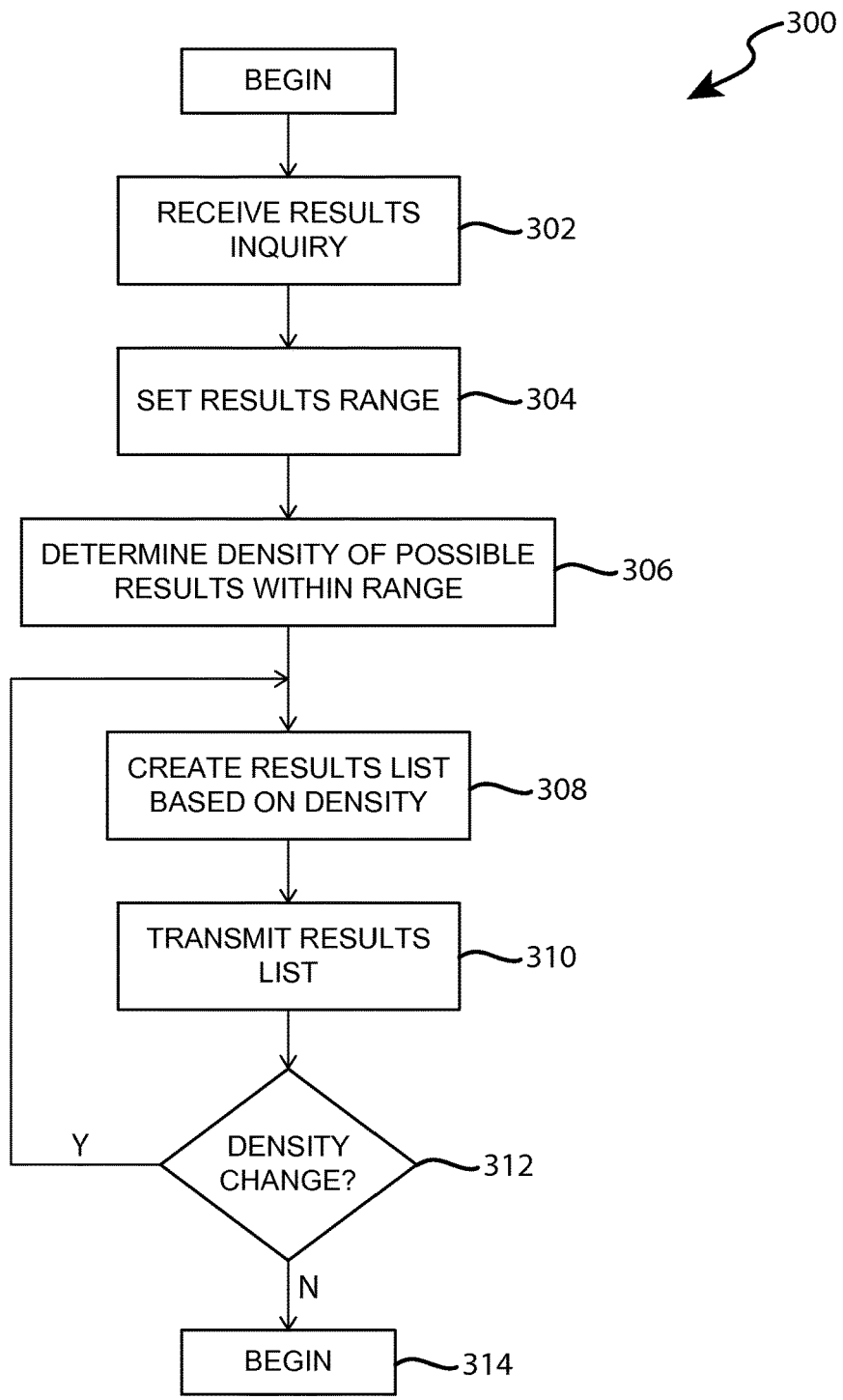
FIG. 3 is a flow chart illustrating a method for implementing population density dependent functions using the system of FIG. 1.

A method for modifying the functionality or one or more characteristics based on population density using the system 100 of FIG. 1 will now be discussed. FIG. 3 is a flow chart illustrating a method for implementing population density dependent functions. With reference to FIG. 3, the method 300 may begin with operation 302 and the processing element 108 of the server 102 may receive a results inquiry from a user device 104a-104n. For example, in a networking application, a user may request via an input to the user device 104a-104n, a results listing of users within a certain range, such as other users near the user's location, users near a landmark or city, or all users with a certain profile trait or characteristic. After the user inputs the results inquiry to the user device 104a-104n, the user device 104a-104n transmits the inquiry to the server 102. In particular, a querying device 104a transmits the request to the server 102 through the network 106. The results list may be previously created or populated and stored in the memory of the server 102 and accessed once the inquiry is received. Alternatively or additionally, the results list may be dynamically generated by the processing element of the server 102.

With reference again to FIG. 3, after operation 302, the method 300 may proceed to operation 304. In operation 304, the server 102 may set the results range for the inquiry. The results range (i.e., the area the search will encompass) may include any distance, area, point of interest, area defined by latitude longitudinal, or the like and may be predetermined, selected by a user, automatically determined, and/or dynamically selected. Additionally, in some embodiments, the results range may be based at least in part by the request by the user and/or may be a default set for the application. For example, the user may request a list of all members within a predetermined range, such as within 5 miles and the processing element then sets the results range to be 5 miles. As another example, the user may request a list of all members that are "nearby" where the application includes a predetermined value for "nearby" or may dynamically adjust the nearby range value based on a location or the population density of the users. As yet another example, the user may request a list of all users with a particular characteristic (e.g., profile description, name, height, hair color, and so on) and the processing element 108 of the server 102 may determine the results range based on the characteristic, the number of users, or other parameter. That is, the server 102 may select a results range based on the user's inquiry.

Once the results range has been determined or set by the processing element 108 of the server 102, the method 300 may proceed to operation 306. In operation 306, the processing element 108 of the server 102 determines the population density of possible results within the predetermined range. The population density may be based on a characteristic of the results range, such as a population of the search area (e.g., census information), may be based on the number of users within that range, the number of active users in that range (e.g., users with the application running on their devices), or a combination thereof.

In one embodiment, the population density may be determined using a quadtree structure or other data structure that recursively subdivides in order to determine data population within a particular area, grid cell, and/or partition. For example, a quadtree structure may use a geohash function to create geocells to index and query geospatial data. As one example, user profiles may be assigned to one or more geocells, which are bounded areas, such as boxes or other shapes, of varying sizes. The bounded areas are associated with the location information reported by the user's device and these areas or geocells may be organized using a quadtree structure and overlaid on a Cartesian representation of the globe or other desired location. The processing element 108 can then associate users within a particular geocell with the area of the globe represented by the particular geocell.

Geocells can be uniquely identified, e.g., by a string fragment, that may be referred to as a geohash and is generated by a geohash function. The characters or bits in the string fragment are arranged from general to specific such that the more bits included the smaller and more precise the geocell may be with respect to a particular point. For example, a geohash of 9ac7be251 may include a small area around a landmark, such as the Empire State Building in New York, N.Y. By removing characters in the geohash, the geocell increases to include the Empire State Building and surrounding blocks and may have a geohash of 9ac7be25. Removing more characters further increases the geohash size to include more surrounding areas, for example, a geohash of 9ac7 would include most of New York City.

To use the geocells to determine density, the processing element 108 may include all user devices associated within a given collection of geocells and may begin with the selected location, which may be the location of the querying user device, and then expand outward therefrom. In some instances, searching each individual geocell may be time consuming and so after a certain amount of processing time if a desired number of search results have not yet been determined, the processing element 108 may switch to coarser or larger geocells.

After the processing element 108 has associated users with particular geocells, the processing element 108 may determine the count or number of users associated with a particular geocell or collection of geocells. The precision, i.e., the number of characters in the geohash, and the number of users within the geocell can then be used by the processing element 108 to determine the density of a particular geocell. The geocells may be organized in a quadtree structure which allows the processing element to efficiently determining the density for substantially any region in the world and may be faster than a point-radius calculation.

Other types of known quadtree data structures may also be used for determining population density.

In another embodiment, the processing element 108 may determine the population density by determining all user devices that fall within the range (i.e., users that would be included in the results list), and based on that number determines population density of users for the range, such as by using a point-radius type of calculation. For example, the processing element 108 can determine every possible match based in the inquiry and range and the number of user devices within the range equals the user population density. In yet another embodiment, the processing element 108 may determine the population density by analyzing the internet protocol (IP) address used by the user devices 104a-104n to access the network 106. In this embodiment, the processing element 108 can group user devices by a first set of bits in the IP address, such as by the first 24 bits of the IP address. In particular, typically users with similar IP addresses may be on the same subnetwork, which typically may encompass users within similar locations.

In this embodiment, the number of users with the same initial bits in the IP addresses will determine the density. For example, if you have multiple users connecting from 102.10.1.X the processing element 108 may determine that the density is high whereas if a single user is connecting from that address, the processing element 108 may determine that the density is low. In another embodiment, the density may be determined based on the census data corresponding to the results range, i.e., the census population density.

Using any of the above examples, the population density may be calculated by the processing element 108. After operation 306 the method 300 may proceed to operation 308. In operation 308, the processing element 108 of the server 102 modifies or varies a results list based on the population density. For example, in instances where the population density may be higher than a predetermined threshold, the results list may be culled or reduced to eliminate some of the users. As another example, in some instances certain functions such as the number of pictures accessible in a user's profile, the information displayed with respect to a user within the list, the manner that the information is displayed, etc., may be varied based on the population density. In this example, the population density may be compared to one or more predetermined thresholds or ranges to determine how the results list may be modified as compared to the pre-modified results list (i.e., "all inclusive" results list). The results list may include a single item or multiple items. For example, in one embodiment, the population density modification may change the results list from multiple user icons to a single user icon.

In some embodiments, the population density and the modification based on the population density modify the results of the results originally returned. In other words, the population density, in some instances, may not change the search criteria used or which the inquiry was based, but rather modifies the results returned from the inquiry.

After operation 308, the method 300 may proceed to operation 310. In operation 310, the server 102 may transmit the results list to the querying user device 104a, such as through the network 106. As discussed above, the results list may be accessed from memory by the server or accessed by be dynamically generated by the processing element of the server 102 and in either example after accessing the results list the server transmits the results list. After the results list is transmitted to the user device 104a, the user device 104a may typically display the results list so that the user may view it.

Once the results list has been transmitted, the method 300 may proceed to operation 312. In operation 312, the processing element 108 of the server 102 may check to determine if the population density has changed. For example, if more users move into a location falling within the results range or alternatively if users move out of the results range, the user population density will vary correspondingly. If the population density has changed from the population density determined in operation 306, the method may return to operation 308 and the results list may be updated based on the new population density. If on the other hand the population density has not changed, the method 300 may proceed to an end state 314. It should be noted that in some embodiments, operation 312 may be omitted and/or may be set to be completed after a predetermined time period, e.g., re-check population density after 20 minutes or the like.

Figure 4:
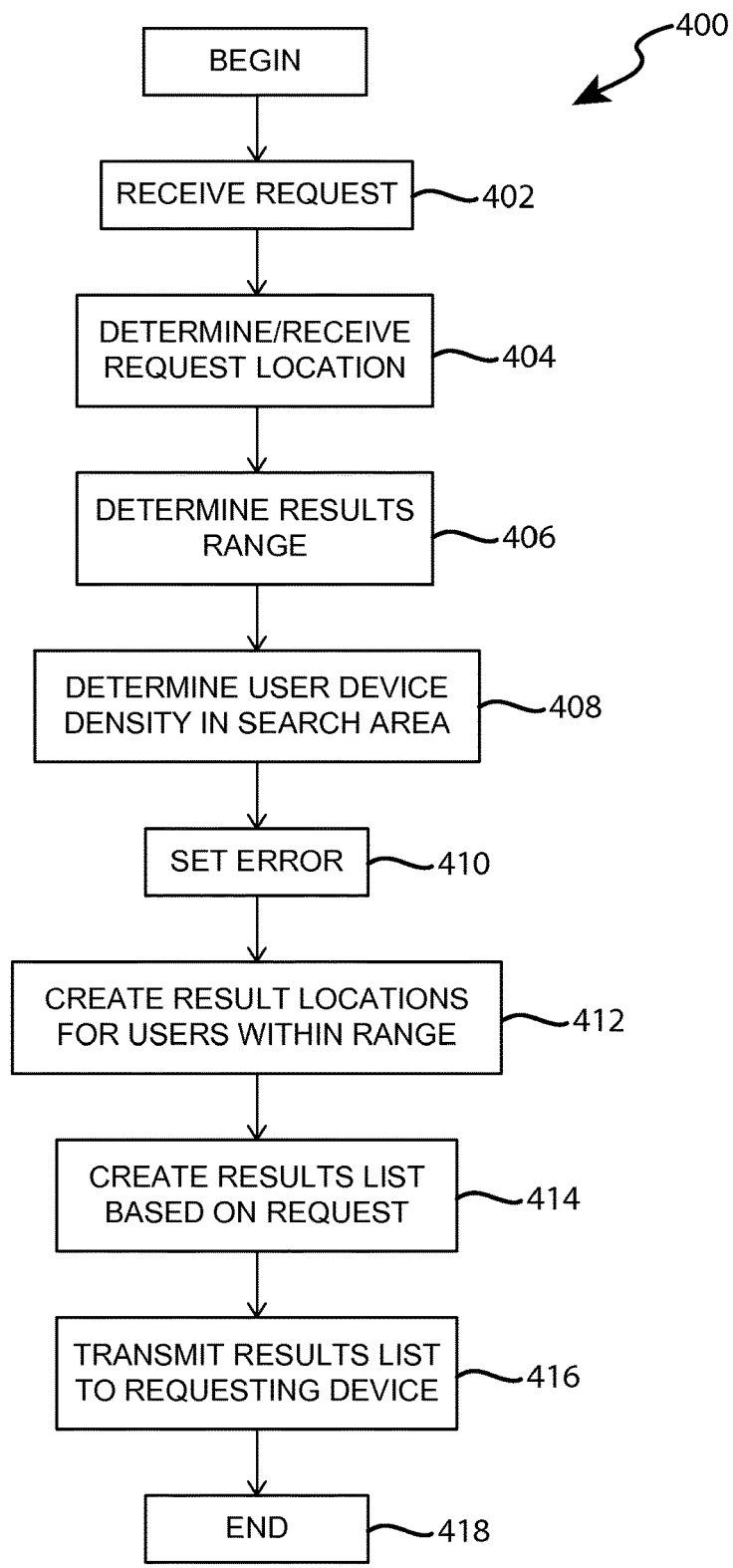
FIG. 4 is a flow chart illustrating a method for modifying a location based results list based on population density using the system of FIG. 1.

As generally discussed above, the method 300 shown in FIG. 3 may be used to modify a number of different features and/or characteristics of a results list, such as a result list from a social networking or dating application. A more specific example of the method of FIG. 3 will now be discussed, in particular a method for modifying user location as shown in a results list based on population density. FIG. 4 is a flow chart illustrating a method for modifying a location based results list depending on population density. With reference to FIG. 4, the method 400 may begin with operation 402, which may be similar to operation 302 in FIG. 3. In particular, in operation 402, the processing element 108 of the server 102 may receive a request from a querying user device 104a. The request may correspond to a request for results, such as show all the users close to my current location or show all of the users within 10 miles of me.

After operation 402, the method 400 may proceed to operation 404 and the server 102 may receive the request location or may determine the request location. For example, in some embodiments, the querying user device 104a may use the location sensors 116 to determine the current location of the querying user device 104a and may then transmit the location to the server 102 through the network 106. As another example, the server 102 may determine the querying location through other methods such as receiving the raw location sensor 116 data and using that data to determine the query location, may request that the user directly input his or her location, or the like.

With continued reference to FIG. 4, once the query location has been determined or received, the method 400 may proceed to operation 406. In operation 406, the processing element 108 of the server 102 may determine the results range. As discussed above with respect to operation 304 in FIG. 3, the processing element 108 may determine the range or area for the query based on the query itself and/or other parameters, e.g., default parameters, thresholds or the like.

Once the results range has been determined, the method 400 may proceed to operation 408. In operation 408, the server 102 determines the population density of user devices 104a-104n within the results or search area. This operation 408 may be similar to operation 306 in FIG. 3. In this example, the population density may be based on the number of user devices 104a-104n within the range. For example, the server 102 may request the location information for all user devices 104a-104n that are active or otherwise accessing the application. The user devices 104a-104n then may transmit their location information from their location sensors 116 to the server 102.

Using the location information of each active user device 104a-104n, the processing element 108 of the server 102 may determine those user devices 104a-104n that fall within the search area or results location by comparing the location of the device to the selected location. Based on the number of user devices 104a-104n that are encompassed by the search area, the processing element 108 may determine the population density (i.e., the number of user devices per space unit) as described above with respect to the method 300. It should be noted that the space unit or location areas for determining the population density may be based on the search area or may be based on predetermined values. For example, the population density may be evaluated based on the number of users in a square mile, regardless of the search area or may be based on the search area and thus may change based on changes to the search area.

With continued reference to FIG. 4, once the population density has been determined, the method 400 may proceed to operation 410. In operation 410, the processing element 108 of the server 102 determines an error criterion, or modification criterion to be applied to the location results. An error criterion is related to a modification that may be done to the location results. Examples of error criterion include an error magnitude, an error value, a specified error, a random error, or the like. As some examples, the error criterion may determine the number of significant digits that may remain unchanged in the location results, may dictate a value to be applied to the location information, and so on. The error criterion may be a random or specified error. For example, the error criterion may dictate that the location results be modified by a randomly generated number (generated in by any suitable known method) or may dictate that the location information be increase by 2% or be increased by 5 or so on.

Returning to FIG. 4, in one embodiment the processing element 108 may determine that the location information for each user device 104a-104n should be modified to introduce an error. The error criterion may include the amount of error or error value to be introduced into the location information. In this example, the error criterion may specify the number of significant figures in the location information that will be varied. This will be discussed in more detail below with respect to FIG. 5. In another example, the error may determine the accuracy of the location information rather than a precise number of digits to randomize or vary from the location information. In this example, the processing element 108 may vary the location information to be a percentage range (e.g., 10-30% accurate) as compared to the actual location information. Other types of error criteria may be used, such as whether the actual location may be used at all, errors within the user names or profiles, or the like, as such, the discussion of any particular type of error is meant as exemplary only.

Figure 5:
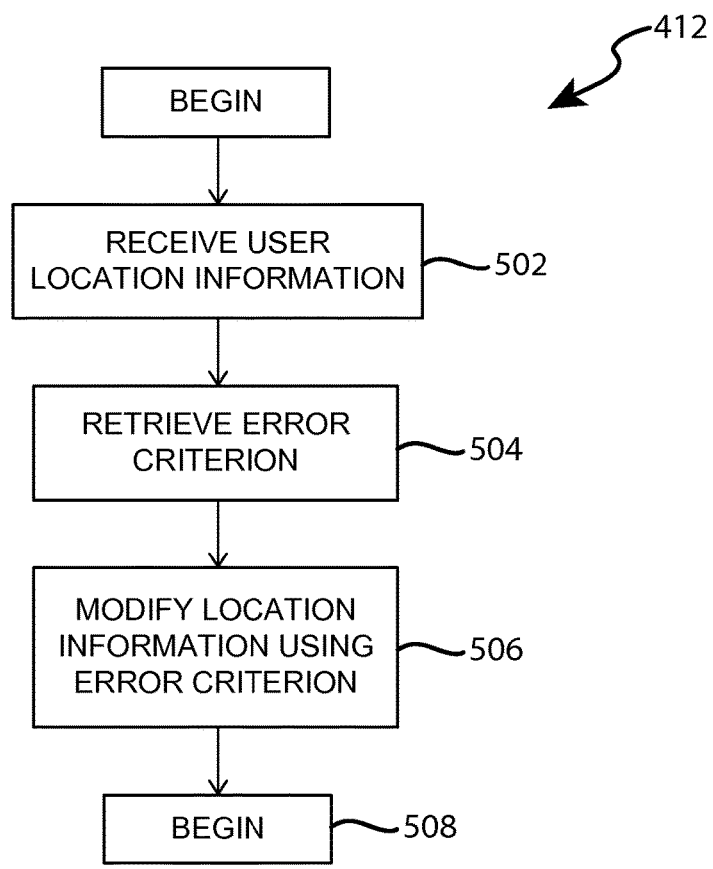
FIG. 5 illustrates a flow chart for one example of operation 412 in the method of FIG. 4.

After the error criterion has been selected, the method 400 may proceed to operation 412. In operation 412, the server 102 may create one or more result locations, such as a modified location, for user devices 104a-104n within the results range. FIG. 5 illustrates a flow chart for one example of operation 412. With reference to FIG. 5, operation 412 may begin with step 502 and the server 102 receives the location information for the user devices 104a-104n. This step 502 may be similar to operation 404 in FIG. 4, but rather than receiving the location information from the querying user device, step 502 may include receiving the location information for all active user device 104a-104n or otherwise all user devices 104a-104n. In operation 412, once the location information for the user devices 104a-104n has been received from each device 104a-104n, the operation 412 may proceed to step 504 and the server 102 may determine the error criterion determined in operation 410 in FIG. 4. For example, the processing element 108 may determine the error value to be applied to the location information or other metric that may be modified with the error.

With continued reference to FIG. 5, after step 504, operation 412 may proceed to step 506 and the processing element 108 of the server 102 may modify the location information for each of the user devices 104a-104n using the error criteria. In some examples, only user devices falling within the search range may be modified and in other examples all user devices may be modified. In one embodiment, the error criterion may determine the number of decimal places in the location information that may be randomized or otherwise varied. For example, in some instances the location information from the location sensors 116 may be provided as a latitude number and a longitude number. In this example, the error controls the decimal point or digit at which the randomization or variation may be applied, so that with a first error value the digits following the hundredths place will be randomized and with a second error value the digits following the thousandths place will be randomized or varied. As one specific example, a location information for one user device 104a-104n may be a latitude of 40.761147 and a longitude of −73.978741. In this example, the first error value will result in a location information having a latitude of 40.7<random digits> and a longitude of −73.9<random digits> and the second error value will result in a location information having a latitude of 40.76<random digits> and a longitude of −73.97<random digits>. Continuing with this example, with the first error value the location information would be more accurate as compared to the second error value.

In other examples, the error criterion may determine the digits to be inserted into the location information, rather than random numbers or may determine a range of decimal places where the values of the location information may be varied, rather than the exact decimal place to be modified.

With reference again to FIG. 5, after step 506, operation 412 may proceed to an end state 508. After operation 412 has been compared with reference again to FIG. 4, the method 400 may proceed to operation 414. In operation 414, the server 102 may create the results list based on the request. The results list includes the modified location information, or the "results locations" for the user devices 104a-104n. In one example, the results list may include a grid of user profiles corresponding to user devices 104a-104n within the search area where the grid is arranged by nearest to farthest, although each of the user device 104a-104n location are modified by the error criterion. In some examples, the error criterion may change only digits after the tenths place of the location information and so the location information may be generally accurate, enough to sort the users by nearest to farthest, but may not provide the exact or actual location of the user device. This allows the users to be displayed in results, but also have some protection from the querying user determining the user's exact location.

The characteristics of the results list may be varied based on the operation of the social networking application, server, or the like, and thus the above examples are meant as exemplary only.

With continued reference to FIG. 4, after operation 414, the method 400 may proceed to operation 416. In operation 416, the server 102 may transmit the results list to the querying user device 104a. For example, the server 102 may transmit data corresponding to the results list via the network 106 to the querying user device.

After the results have been transmitted to the querying user device, the method 400 may proceed to an end state 418 and terminate.

Using the method 400 of FIG. 4, the results list may be modified to protect the geolocation of users displayed in the results list. For example, by varying the location information based on population density, the actual location of the users may not be displayed; rather the "results location" will be displayed. In embodiments where the accuracy of the location information increases as the population density increases, users in crowded locations can more easily find each other or find other users as the results will be tailored to show users that are closer in range, especially when arranged in a grid by distance.

Additionally, in embodiments where location information accuracy depends on population density, the system 100 can balance users' desires to know each other's locations with the risk of unwanted detection. In particular, using unmodified or actual location information, a hacker or person may be able to determine a user's actual location using trilateration or other locating method, even if the location information (e.g., latitude and longitude) was not displayed or provided by the application. However, this risk is inversely related to population density of an area, e.g., census-type population data. That is, the ability to determine an actual location of a user is easier when there are fewer people per area. Thus, by increasing an error introduced into the location information as the detection risk increases, the system 100 dynamically adjusts to the variation in risk with changes in population density, which allows the system to balance the detection risk against the desires of the users to have accurate results list indicating which members may be closest to them.

Figure 6:
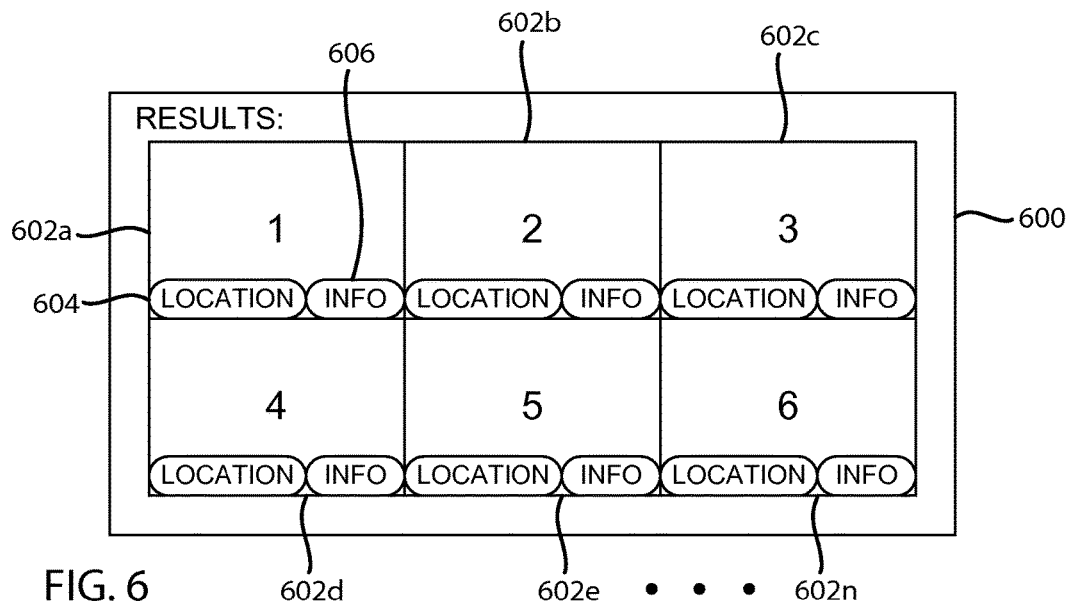
FIG. 6 is an example of a user interface for displaying a results lists in accordance with the system of FIG. 1.
Figure 7A:
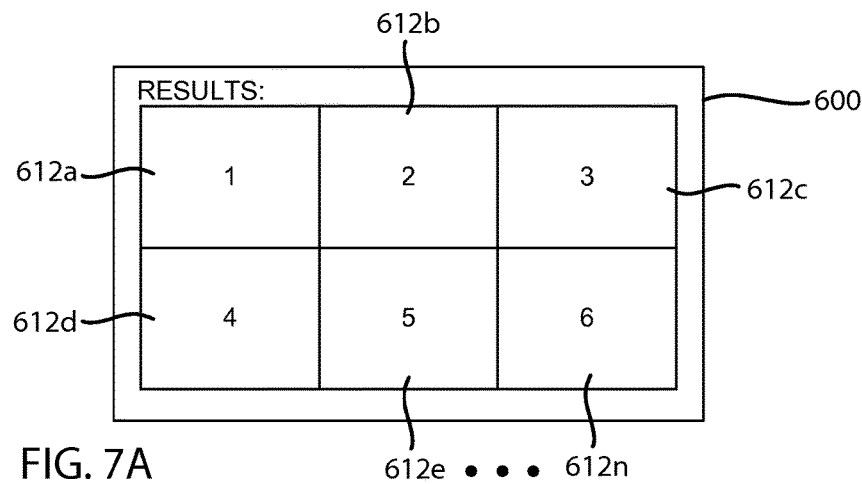
FIG. 7A is another example of a user interface for displaying a results lists in accordance with the system of FIG. 1.
Figure 7B:
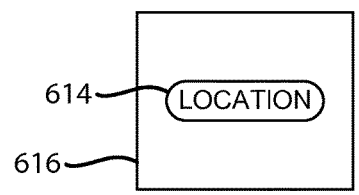
FIG. 7B is an example of a user interface to be used with the interface of FIG. 7A to provide additional information not shown in the interface of FIG. 7A.

FIGS. 6-7B illustrate various examples of the results lists that may be transmitted to the querying user device using one of the methods 300, 400 of FIG. 3 or 4. With reference to FIG. 6, in one example, the results list 600 may include a plurality of user icons 602a-602n organized in a grid by location. In particular, the first user icon 602a may be the closest user to the querying user device 104a and the last user icon 602n may be the farthest user from the querying device. However, other organization methods are envisioned as well, such as a list, grid organized in descending distance (e.g., farthest to closest or the like). As such, the results list 600 FIG. 6 is meant as illustrative only.

With continued reference to FIG. 6, the results list 600 may also include data related to the user, such as a location icon 604 and/or information icon 606. The location icon 604 may include data corresponding to the user's location, such as, but not limited to, a latitude/longitude or other coordinates, a dot on a map, cross street information, building information, or the like. The user information icon 606 may include additional data about the user, such as one or more profile pictures, profile information (e.g., favorite restaurants, interests, status, etc.). The type, configuration, and amount of information shown for both the location icon 604 and the information icon 606 may be varied based on the population density of user devices. For example, in one embodiment, neither of the icons 604, 604 may be displayed in the initial results list when the population density is below a predetermined threshold but will be displayed when the population density is above the threshold.

With reference to FIG. 7A, in one embodiment, the results lists 700 may include only the user icon 612a-612n with the location icon 604 and information icon 606 omitted. In this example, the information displayed on the results list 700 is reduced as compared to the results list 600. In the example shown in FIG. 7A, in some embodiments, the querying user may be able to receive the additional user data by selecting a user icon 612a. When the user icon 612a is selected, the user interface may open a new window or display that includes a larger version of the user icon 612a. For example, with reference to FIG. 7B, the user interface may include a user icon 616 where the location icon 614 is displayed more prominently, such as having an increased size, as compared to the results list 600.

It should be noted that the examples shown in FIGS. 6-7B illustrating various examples of the results list and features that may be varied based on population density are meant as illustrative only. Many other variations to the results list and the data presented therein are envisioned. As a first example, in some embodiments, the arrangement of the results list and the icons may be varied based on population density. In this example, the user icons 602a-602n may be presented in a different format, such as dots on a map in a high population density whereas in a low population density the profile pictures for the users may be displayed in a list or grid without providing location information. As a second example, in some embodiments, certain users may be hidden or may not be displayed depending on the population density. As a third example, in a high-density population area the results list may include (either incorporated into the user grid, separate therefrom, or arranged to be displayed at the same time) an events list. The events list may include events that are occurring at the same time and within the search range or other event area. The events list may also include a list of those users that have indicated that they are attending (e.g., RSVP'd). In this example, below a certain population density level, the events list may not include the RSVP list or may not be displayed at all. As a fourth example, in a high population density area, the results lists may include a list or other display of recommended or favorite restaurants, bars, retail stores, or clubs. The recommended establishments may be those that are recommended by the users within the results list or may be those that are within the search area.

In short, the system 100 and methods 300, 400 disclosed herein are meant to encompass substantially any type of location and/or user information that may be varied or that may be affected by population density.

The foregoing description has broad application. For example, while examples disclosed herein may focus a social networking application, it should be appreciated that the concepts disclosed herein may equally apply to substantially any other member or user based interactive network, such as, video games, blogs, or the like. Similarly, although the controller may be discussed with respect to a server and smart phone, the devices and techniques disclosed herein are equally applicable to other types of computing devices. Accordingly, the discussion of any embodiment is meant only to be exemplary and is not intended to suggest that the scope of the disclosure, including the claims, is limited to these examples.

What is claimed is:

1. A method for varying search results of a user-based networking application, comprising:
   accessing from a processing element a results list responsive to an inquiry, the results list containing information;
   determining by the processing element a population density corresponding to a selected location;
   determining by the processing element an error criterion dependent on the determined population density; and
   modifying, by the processing element, the information of the results list by introducing an error into the information of the results list according to the error criterion, to create a modified-results list having the information with the error for display on a user device.

2. The method of claim 1, further comprising transmitting the results list to, receiving the inquiry from, and displaying the modified-results list on the user device.

3. The method of claim 1, wherein the error criterion is dependent on a population density of user devices within the selected location.

4. A method for varying search results of a user-based networking application, comprising:
   receiving an inquiry from a querying user device and generating a results list based thereon;
   determining by a processing element a population density corresponding to a selected location;
   based on the population density, introducing by the processing element an error into the information of the results list to produce a modified results list for display on the querying user device, thereby increasing a level of error of the results list for display; and
   transmitting the results list with the introduced error to the querying user device.

5. The method of claim 4, wherein the population density corresponds to a population density of users of the networking application encompassed within the selected location.

6. The method of claim 4, further comprising receiving data on a location of the user device, wherein the selected location is a location of the querying user device.

7. The method of claim 4, wherein the information of the results list relates to locations of one or more member devices within the selected location.

8. The method of claim 7, further comprising determining one or more actual member locations corresponding to the locations of the one or more member devices within the selected location.

9. The method of claim 8, wherein introducing the error by the processing element into the information of the results list comprises:
   determining by the processing element an error criterion, wherein one or more characteristics of the error criterion is selected based on the population density; and
   modifying by the processing element the one or more actual member locations by the error criterion.

10. The method of claim 9, wherein the error criterion comprises a decimal location for insertion of a random number.

11. The method of claim 9, wherein the error criterion comprises a magnitude of potential error, which magnitude is dependent on the population density.

12. A system for providing results to one or more user devices comprising:
   a network for transmitting data; and
   a server in communication with the network and configured to perform the following operations:
      receive an inquiry from a querying user device, the inquiry including a location and a distance characteristic related to the location;
      determine a population density of the location;
      based on the population density, determining an error criterion;
      introducing an error into location information of a results list of the inquiry by modifying the location information of the results list according to the error criterion to generate a modified-results list having an increased level of error in the location information; and
      transmit the modified-results list to the querying user device.

13. The system of claim 12 further comprising a querying user device in communication with the network, wherein the querying user device is configured to perform the following operations:
   transmit to the server the inquiry;
   receive the modified-results list from the server; and
   display on a display screen the modified-results list, wherein the modified-results list is displayed in a grid configuration.

14. The system of claim 13, further comprising a plurality of member user devices in communication with the network, wherein the plurality of member user devices are configured to perform the following operations:
   transmit to the server an actual location of the member user device.

15. The system of claim 14, wherein the server is further configured to:
   modify the one or more actual member locations by the error criterion.

16. The system of claim 15, wherein the error criterion comprises a decimal location for insertion of a random number.

17. The system of claim 15, wherein the error criterion comprises a magnitude of potential error.

18. The method of claim 17, wherein the introduction of the error limits the ability of a user to determine the initial location information based on the modified parameter.

19. The method of claim 1, wherein the error criterion comprises a random error introduced into the information.

20. The method of claim 1, wherein introducing the error according to the error criterion comprises a modification of the location information such that the level of error in the location information is within a percentage range compared to the initial parameter.

21. The method of claim 1, wherein the error criterion comprises a decimal location for introduction of the error.

22. The method of claim 21, wherein the error is introduced by replacing the information of the results list at the decimal location with a different number to generate the modified-results list.

23. The method of claim 22, wherein the different number is a random number used to generate the modified-results list.

24. The method of claim 1, wherein the error criterion comprises a number of significant digits that remain unchanged in the information of the results list.

25. The method of claim 1, wherein:
   the error criterion comprises a mathematical function; and
   the error is introduces by applying the mathematical function to the information of the original results list to generate the modified-results list.

26. The method of claim 1, wherein the step of determining the error criterion that is dependent on a determined population density comprises establishing a threshold population density for triggering introduction of the error according to the error criterion.

* * * * *